United States Patent
Heid et al.

(10) Patent No.: US 10,323,544 B2
(45) Date of Patent: Jun. 18, 2019

(54) SYSTEM AND METHOD FOR SUPPLYING AN ENERGY GRID WITH ENERGY FROM AN INTERMITTENT RENEWABLE ENERGY SOURCE

(71) Applicant: Siemens Aktiengesellschaft, Munich (DE)

(72) Inventors: Oliver Heid, Erlangen (DE); Paul Beasley, Abingdon (GB); Timothy Hughes, Wantage (GB)

(73) Assignee: Siemens Aktiengesellschaft, Munich (DE)

( * ) Notice: Subject to any disclaimer, the term of this patent is extended or adjusted under 35 U.S.C. 154(b) by 202 days.

(21) Appl. No.: 15/315,488

(22) PCT Filed: Jun. 16, 2014

(86) PCT No.: PCT/EP2014/062580
§ 371 (c)(1),
(2) Date: Dec. 1, 2016

(87) PCT Pub. No.: WO2015/192874
PCT Pub. Date: Dec. 23, 2015

(65) Prior Publication Data
US 2018/0209306 A1    Jul. 26, 2018

(51) Int. Cl.
*C01C 1/04* (2006.01)
*F03D 9/19* (2016.01)
*F01K 13/00* (2006.01)
*F01K 13/02* (2006.01)
(Continued)

(52) U.S. Cl.
CPC ............ *F01K 13/02* (2013.01); *C01C 1/0405* (2013.01); *F01K 13/00* (2013.01); *F01K 23/064* (2013.01);
(Continued)

(58) Field of Classification Search
CPC ...................................................... Y02E 70/10
See application file for complete search history.

(56) References Cited

U.S. PATENT DOCUMENTS 3,705,009 A * 12/1972 Dougherty .............. C01B 3/382
423/361
2006/0065545 A1 * 3/2006 Balan ........................ C25B 1/04
205/628

(Continued)

FOREIGN PATENT DOCUMENTS

KR      101200561 B1    11/2012
RU       99102865 A     12/2000

(Continued)

OTHER PUBLICATIONS

International Search Report dated Feb. 12, 2015, for PCT application No. PCT/EP2014/062580.

(Continued)

*Primary Examiner* — Laert Dounis
(74) *Attorney, Agent, or Firm* — Beusse Wolter Sanks & Maire (57) ABSTRACT

A system and method for supplying an energy grid with energy from an intermittent renewable energy source having a production unit for producing Hydrogen and Nitrogen, a mixing unit configured to receive and mix the Hydrogen and the Nitrogen produced by the production unit, an Ammonia source for receiving and processing the Hydrogen-Nitrogen-mixture, an Ammonia power generator for generating energy for the energy grid, a heat distribution system with one or more heat exchangers, and an Ammonia cracker, which is fluidly connected to the Ammonia storage vessel and to the Ammonia power generator, and which is configured and arranged to receive Ammonia from the Ammonia storage vessel, to effect a partial cracking of the received Ammonia to form an Ammonia-Hydrogen-mixture and to (Continued)

direct the Ammonia-Hydrogen-mixture to the Ammonia power generator for combustion.

15 Claims, 3 Drawing Sheets

(51) Int. Cl.
    *F01K 23/06*     (2006.01)
    *F01K 25/00*     (2006.01)

(52) U.S. Cl.
    CPC ............ *F01K 25/00* (2013.01); *F01K 25/005* (2013.01); *F03D 9/19* (2016.05); *F05B 2220/61* (2013.01); *Y02E 10/72* (2013.01); *Y02E 70/10* (2013.01); *Y02P 20/128* (2015.11); *Y02P 20/129* (2015.11); *Y02P 20/13* (2015.11); *Y02P 20/133* (2015.11); *Y02P 20/52* (2015.11)

(56) References Cited

U.S. PATENT DOCUMENTS

| | | |
|---|---|---|
| 2007/0107432 A1 | 5/2007 | Smith |
| 2008/0102329 A1* | 5/2008 | Hollinger ............ H01M 16/003 |
| | | 429/418 |
| 2008/0241033 A1* | 10/2008 | Nazri ...................... C01B 3/047 |
| | | 423/237 |
| 2009/0211541 A1* | 8/2009 | Nakamura .............. C01B 3/042 |
| | | 123/3 |
| 2010/0101231 A1 | 4/2010 | Westmeier |
| 2012/0068471 A1 | 3/2012 | Robertson |
| 2013/0288143 A1 | 10/2013 | Lee |
| 2014/0238316 A1* | 8/2014 | Tange ..................... C01B 3/047 |
| | | 123/3 |

FOREIGN PATENT DOCUMENTS

| | | |
|---|---|---|
| RU | 2435041 C2 | 11/2011 |
| RU | 2435050 C2 | 11/2011 |
| WO | 2014078659 A2 | 5/2014 |

OTHER PUBLICATIONS

Russian Federation decision of grant dated Mar. 12, 2018, for RU patent application No. 2016149389.

* cited by examiner

SYSTEM AND METHOD FOR SUPPLYING AN ENERGY GRID WITH ENERGY FROM AN INTERMITTENT RENEWABLE ENERGY SOURCE

CROSS REFERENCE TO RELATED APPLICATIONS

This application is the US National Stage of International Application No. PCT/EP2014/062580 filed Jun. 16, 2014, and claims the benefit thereof, incorporated by reference herein in its entirety.

FIELD OF INVENTION

The invention relates to system and method for supplying an energy grid with energy from an intermittent renewable energy source.

BACKGROUND OF INVENTION

The uptake of renewable natural resources (renewables) for energy generation in the last years has been impressive, but there is still the unsolved problem of dealing with the transient nature of the renewables. Both solar and wind power are intermittent by their nature and, therefore, it is not possible to provide a dependable baseload to the energy networks. Since the demand of energy consumers can be irregular, a power supply based on renewables does not match the demand of the consumers. Also, the excess energy, i.e. the amount of energy which would be momentarily available from renewables but which is not demanded by the consumers at that time, strains the energy networks and would get lost in case it is not consumed.

Thus, conditions exist in which the energy momentarily provided by renewables is not sufficient to cover the demand. However, there would also be conditions in which the energy momentarily provided by renewables is exceeding the current demand. As the proportion of energy from renewable sources increases, the situation will become unsustainable.

A promising approach for solving these drawbacks would be the use of long term energy buffers or storages which are suitable to store the energy. Such a solution would allow to handle situations in which the demand exceeds the available energy as well as situations in which excess energy is available.

A variety of buffering solutions for storing electrical energy are known, e.g. Lithium batteries and Vanadium based Redox batteries, but these solutions cannot provide the necessary scale of energy storage. Hydrogen offers another carbon free route for storing energy, but it is difficult and risky to utilize. In gaseous form it has to be compressed to 500 bars in order to achieve a suitable energy density. Liquid Hydrogen requires cryogenic temperatures and the associated complicated infrastructure. Moreover, the use of Hydrogen in either form requires safeguards due to the risk of explosion. For these reasons, Hydrogen is not considered to be a qualified candidate for energy storage.

Thus, there are currently no reliable and appropriate means for decoupling energy supply and demands for renewable energies on a local or national scale.

SUMMARY OF INVENTION

It is an object of the invention to provide a solution for supplying an energy grid with energy from an intermittent renewable energy source.

The object is solved by a system and a method according to the independent claims.

The invention is based on the approach of storing at least parts of the energy generated using renewable. This is achieved by using that energy to produce Hydrogen and Nitrogen. Hydrogen and Nitrogen are subsequently converted into Ammonia (NH3) which is a carbon-free fuel and which can be stored at ambient temperatures. Also, NH3 can be transported effectively and safely using pipelines, railroads, shipping and trucks. Moreover, NH3 offers the advantages that it can be synthesized in a carbon free process and it can be burned without generating green house gases.

The invention achieves a decoupling of the supply and demand of electricity from fluctuating renewable energy sources by using the renewable energy for the generation of Ammonia which can be stored subsequently. The stored Ammonia can then be used in a NH3 power generator to generate electricity which is fed into the electricity grid. This integrated solution proposed by the invention allows to translate intermittent electricity into a baseload provided by the renewable energy source to the local or national energy grid.

Further improvement is achieved by making use of waste heat which is generated at a stage or component of the system during operation of that stage or component. The waste heat is collected by a corresponding heat exchanger and at least partially transferred to another stage or component of the system the operation and efficiency of which at least can be improved by or even necessitates the presence of an elevated temperature. This results in an improved efficiency of the whole system.

Thus, the presence of the NH3 storage vessel as a buffer allows a better flexibility of providing energy to the energy grid and, therefore, an improved load balancing. Moreover, the efficiency of the system and method is improved by making use of heat generated at one stage or component of the system by transferring at least a portion of the heat to another stage or component of the system.

The invention can be applied for operating the energy network based on renewable energies as well as in the local energy supply for heavy industry and rural areas, grid stabilization.

In more detail, the system for providing energy for an energy grid and for load balancing of an energy input for the energy grid based on intermittent renewable energy provided by a renewable energy source, comprises—an H2-N2-production unit for producing Hydrogen and Nitrogen, wherein the H2-N2-production unit is operated by using energy provided by the renewable energy source,—a mixing unit configured to receive and mix the Hydrogen and the Nitrogen produced by the H2-N2-production unit to form a Hydrogen-Nitrogen-mixture,—an NH3 source for receiving and processing the Hydrogen-Nitrogen-mixture for generating a gas mixture containing NH3, wherein the NH3 source is fluidly connected to the mixing unit to receive the Hydrogen-Nitrogen mixture from the mixing unit and wherein the NH3 source is configured to generate the gas mixture containing NH3 from the Hydrogen-Nitrogen-mixture, wherein the NH3 source comprises an NH3 storage vessel for storing at least a part of the NH3 of the gas mixture containing NH3,—an NH3 power generator for generating energy for the energy grid, wherein the NH3 power generator is fluidly connected to the NH3 storage vessel to receive a gas stream containing NH3 from the NH3 storage vessel and wherein the NH3 power generator comprises a combustion chamber to combust the received NH3 of the gas stream to generate the energy for the energy grid, and—a heat distribution system with one or more heat exchangers, wherein—each one of the one or more heat exchangers is in thermal contact with and assigned to at least one of one or more first components of the system for receiving process heat, e.g. waste heat or other heat which is generated during operation of the corresponding component, from the assigned at least one first component during operation of the at least first one component,—each one of the one or more heat exchangers is arranged and configured to transfer at least a portion of received process heat to at least one of one or more second components of the system.

Therein, the relevant characteristic of each one of the first components is the generation of heat during operation of the first component. The heat generated by the first component is transferred to the corresponding heat exchanger due to the thermal contact.

Therein, the relevant characteristic of each one of the second components is the consumption of heat during operation of the second component or at least an improved operation and/or efficiency when an elevated operating temperature can be provided. Both is achieved by providing the heat from the heat exchangers.

Moreover, each one of the one or more first components is assigned to and in thermal contact with at least one of the one or more heat exchangers.

One of the one or more first components might be the NH3 power generator. Thus, the efficiency of the system is improved because waste heat is re-directed into the process.

Therein, one of the one or more second components is the mixing unit, wherein the transferred portion of process heat is utilized in the mixing of Hydrogen and Nitrogen to boost the forming of the Hydrogen-Nitrogen-mixture. This increases the efficiency of the whole system.

The H2-N2-production unit might comprise—a Hydrogen electrolyzer for producing the Hydrogen, wherein the Hydrogen electrolyzer is configured to receive water and energy produced by the renewable energy source and to produce the Hydrogen by electrolysis, and/or—an air separation unit for producing the Nitrogen, wherein the air separation unit is configured to receive air and energy produced by the renewable energy source and to produce the Nitrogen by separating the received air. This allows to produce Hydrogen H2 and Nitrogen N2 by utilizing energy from the renewable energy source, finally resulting in the ability to store that energy in form of NH3.

One of the one or more first components might be the Hydrogen electrolyzer. Thus, the efficiency of the system is improved because waste heat is re-directed into the process.

The mixing unit might be fluidly connected to the H2-N2-production unit to receive the Hydrogen and Nitrogen produced therein, wherein the mixing unit might comprise a mixer for mixing the Hydrogen with the Nitrogen to form a Hydrogen-Nitrogen-mixture and a compressor for compressing the Hydrogen-Nitrogen-mixture from the mixer to form a compressed Hydrogen-Nitrogen-mixture to be directed to the NH3 source. Thus, the mixing unit provides a compressed H2-N2-mixture.

One of the one or more second components might be the mixer, wherein the portion of process heat transferred to the mixer is utilized to boost the mixing of Hydrogen and Nitrogen. Thus, the efficiency of the system is improved because waste heat is re-directed into the process.

The NH3 source might comprise an NH3 reaction chamber configured to receive the Hydrogen-Nitrogen-mixture from the mixing unit and to process the received Hydrogen-Nitrogen-mixture to form the gas mixture containing NH3 by an exothermic chemical reaction, wherein one of the one or more first components is the NH3 reaction chamber. The function of the NH3 reaction chamber is based on an exothermic chemical reaction and the corresponding waste heat produced during operation can be re-directed to the system to improve the efficiency.

The NH3 source might further comprise a separator for receiving the gas mixture containing NH3 from the NH3 reaction chamber, wherein—the separator is configured to separate NH3 from the gas mixture containing NH3 such that NH3 and a remaining Hydrogen-Nitrogen-mixture are produced and—the separator is fluidly connected to the NH3 storage vessel to direct the produced NH3 to the NH3 storage vessel. The usage of the separator allows an efficient production of NH3.

In one embodiment, an additional a re-processing unit for re-processing the remaining Hydrogen-Nitrogen-mixture with a re-compressor and a second mixer is available, wherein—the re-compressor is fluidly connected to the separator to receive and compress the remaining Hydrogen-Nitrogen-mixture from the separator,—the second mixer is fluidly connected to the re-compressor to receive the compressed remaining Hydrogen-Nitrogen-mixture from the re-compressor,—the second mixer is fluidly connected to the mixing unit to receive the Hydrogen-Nitrogen-mixture from the mixing unit, and wherein—the second mixer is configured to mix the Hydrogen-Nitrogen-mixture from the mixing unit and the compressed remaining Hydrogen-Nitrogen-mixture from the re-compressor to form the Hydrogen-Nitrogen mixture to be provided to the NH3 source. The use of the re-processing unit allows to re-cycle remaining H2 and N2 to form further NH3.

One of the one or more second components might be the second mixer. This boosts the efficiency of the H2-N2-mixing process and, therewith, the efficiency of the whole system.

In an alternative embodiment, the separator might be fluidly connected to the mixing unit to direct the remaining Hydrogen-Nitrogen-mixture from the separator to the mixing unit, such that the remaining Hydrogen-Nitrogen-mixture is mixed in the mixing unit with the Hydrogen and the Nitrogen from the H2-N2-production unit to form the Hydrogen-Nitrogen-mixture to be received by the NH3 source. This also allows to re-cycle remaining H2 and N2 to form further NH3.

The system might further comprise an NH3 cracker, which is fluidly connected to the NH3 storage vessel and to the NH3 power generator, and which is configured and arranged—to receive NH3 from the NH3 storage vessel,—to effect a partial cracking of the received NH3 to form an NH3-Hydrogen-mixture and—to direct the NH3-Hydrogen-mixture to the NH3 power generator for combustion. The utilization of the NH3 cracker allows to provide an NH3-Hydrogen-gas-mixture to the NH3 power generator which has better combustion properties.

One of the one or more second components might be the NH3 cracker. This has the effect of a higher efficiency of NH3 cracking because the operation principle of the NH3 cracker is based on the consumption of heat. Thus, the overall efficiency of the system is improved.

The system might further comprise a main control unit for controlling the generation of the NH3 to be stored in the NH3 storage vessel and/or the generation of energy with the NH3 power generator.

For example, the controlling can be achieved by regulating the energy flow provided to the H2-N2-production unit and, therewith, the production of H2 and N2 or by regulating the mass flow in the system via influencing mixers, compressors or other components and/or by regulating the temperature in NH3 reaction chamber.

The main control unit might be configured and arranged, i.e. connected to corresponding components, such that the controlling of the generation of the NH3 to be stored in the NH3 storage vessel and/or the controlling of the generation of energy with the NH3 power generator at least depends on an actual power demand in the energy grid and/or on an amount of energy currently generated by the renewable energy source. This allows a flexible energy supply which reacts to actual demands in the energy grid and which on the other hand allows to store energy form the renewable energy source in case of low demands.

The main control unit might be configured—to preferably simultaneously reduce the generation of the NH3 to be stored in the NH3 storage vessel, which can be achieved by controlling the generation of the gas mixture containing NH3, and/or increase the generation of energy during periods of low renewable energy input from the renewable energy source,—to preferably simultaneously increase the generation of the NH3 to be stored in the NH3 storage vessel and/or reduce the generation of energy during periods of high renewable energy input from the renewable energy source.

This also allows effective load balancing of an energy input for the energy grid and a flexible energy supply which reacts to actual demands in the energy grid and which on the other hand allows to store energy form the renewable energy source in case of low demands.

Therein, the terms "low" and "high" can be referenced to certain given threshold values. I.e. a low renewable energy input means that the actual renewable energy input is less than a first threshold and a high renewable energy input means that the actual renewable energy input is more than a second threshold. First and second threshold can be identical or different from each other.

The system might further comprise an energy distribution unit which is configured to receive the energy provided by the renewable energy source and to distribute the energy to the energy grid and/or to the H2-N2-production unit, wherein the distribution depends on an energy demand situation in the energy grid. For example, in case of a higher energy demand from the energy grid, the fraction of energy provided by the renewable energy source to the energy grid is higher and the remaining fraction which is provided to the system is lower. In case of a lower energy demand from the energy grid, the fraction of energy provided by the renewable energy source to the energy grid is lower and the remaining fraction which is provided to the system is higher. This allows an effective operation of the system and, in the consequence, load balancing of an energy input for the energy grid.

In a corresponding method for providing energy for an energy grid and for load balancing of an energy input for the energy grid based on intermittent renewable energy provided by a renewable energy source,—at least a part of the energy from the renewable energy source is used to produce Hydrogen and Nitrogen in a H2-N2-production unit,—the produced Hydrogen and Nitrogen are mixed in a mixing unit to form a Hydrogen-Nitrogen-mixture,—the Hydrogen-Nitrogen-mixture is processed in an NH3 source to generate a gas mixture containing NH3, —NH3 of the gas mixture containing NH3 is stored in a NH3 storage vessel,—an NH3 stream from the NH3 storage vessel is directed to a combustion chamber of an NH3 power generator for combusting the NH3 of the NH3 stream to generate energy for the energy grid, wherein—at least a portion of process heat, e.g. waste heat or other heat which is generated during operation of the corresponding component, generated in at least one of one or more first components of the system during operation of the at least one first component is transferred to at least one of one or more second components of the system.

One of the one or more first components might be the NH3 power generator.

One of the one or more second components might be the mixing unit, especially a mixer of the mixing unit for mixing the Hydrogen with the Nitrogen to form a Hydrogen-Nitrogen-mixture, wherein the transferred portion of process heat is utilized in the mixing of Hydrogen and Nitrogen.

The Hydrogen might be produced in a Hydrogen electrolyzer of the H2-N2-production unit, wherein one of the one or more first components is the Hydrogen electrolyzer.

The NH3 source might comprise an NH3 reaction chamber which receives the Hydrogen-Nitrogen-mixture from the mixing unit and which processes the received Hydrogen-Nitrogen-mixture to form the gas mixture containing NH3 by an exothermic chemical reaction, wherein one of the one or more first components is the NH3 reaction chamber.

The gas mixture containing NH3 might be directed to a separator which separates NH3 from the gas mixture containing NH3 such that the NH3 to be stored in the NH3 storage vessel and a remaining Hydrogen-Nitrogen-mixture are produced.

The remaining Hydrogen-Nitrogen-mixture might be re-compressed and the re-compressed remaining Hydrogen-Nitrogen-mixture is mixed with the Hydrogen-Nitrogen-mixture from the mixing unit in a second mixer to form the Hydrogen-Nitrogen-mixture to be received by the NH3 source.

One of the one or more second components might be the second mixer.

The NH3 stream from the NH3 storage vessel might be directed to an NH3 cracker before it reaches the NH3 power generator. The NH3 cracker effects a partial cracking of the NH3 received from the NH3 storage vessel to form an NH3-Hydrogen-mixture and the NH3-Hydrogen-mixture is directed as NH3 stream to the NH3 power generator for combustion.

The utilization of the NH3 cracker allows to provide an NH3-Hydrogen-gas-mixture to the NH3 power generator which has better combustion properties.

One of the one or more second components is the NH3 cracker. This has the effect of a higher efficiency of NH3 cracking because the operation principle of the NH3 cracker is based on the consumption of heat. Thus, the overall efficiency of the system is improved.

A main control unit of the system might control the generation of the NH3 to be stored in the NH3 storage vessel and/or the generation of energy with the NH3 power generator.

Again, for example, the controlling can be achieved by regulating the energy flow provided to the H2-N2-production unit and, therewith, the production of H2 and N2 or by regulating the mass flow in the system via influencing mixers, compressors or other components and/or by regulating the temperature in NH3 reaction chamber.

The main control unit might control the generation of the NH3 to be stored in the NH3 storage vessel and/or the generation of energy with the NH3 power generator at least depending on an actual power demand in the energy grid and/or on an amount of energy currently generated by the renewable energy source.

Moreover, the main control unit—preferably simultaneously reduces the generation of the NH3 to be stored in the NH3 storage vessel and/or increases the generation of energy during periods of low renewable energy input from the renewable energy source,—preferably simultaneously increases the generation of the NH3 to be stored in the NH3 storage vessel and/or reduces the generation of energy during periods of high renewable energy input from the renewable energy source.

The main control unit controls the generation of NH3 and the generation of energy. For example, during periods in which the renewable energy source generates less energy, for example and in the case of a windmill during phases of low wind, the main control unit would power up the NH3 power generator to supply more energy into the energy grid because the supply by the renewable energy source might not be sufficient. During periods of in which the renewable energy source generates a high amount of energy, for example during phases with strong wind, the main control unit would power down the NH3 power generator because the renewable energy source provides sufficient energy to the grid. However, the main control unit would increase the production and storage of NH3.

A device being "fluidly connected" to a further device means that a fluid can be transferred via a connection between the devices, e.g. a tube, from the device to the further device. Therein, a fluid can be gaseous as well as liquid.

BRIEF DESCRIPTION OF THE DRAWINGS

In the following, the invention is explained in detail on the basis of FIG. 1. Like reference numerals in different figures refer to the same components.

DETAILED DESCRIPTION OF INVENTION

Figure 1:
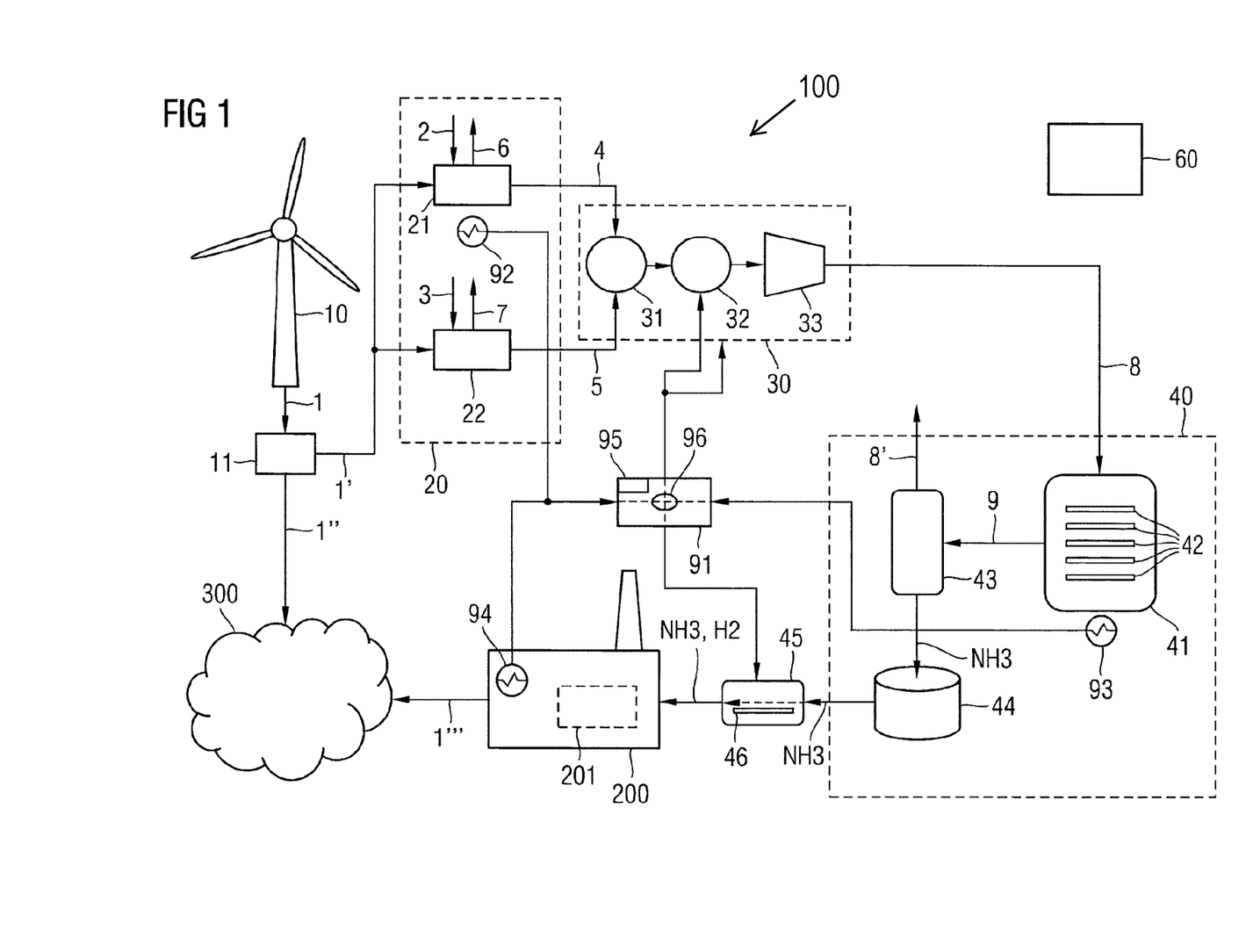
FIG. 1 shows a system for load balancing of an intermittent renewable energy source.

The system 100 shown in FIG. 1 comprises a renewable energy source 10, for example a windmill or a windfarm with a plurality of individual windmills. Alternatively, the renewable energy source 10 can also be a solar power plant or any other power plant which is suitable for generating energy out of a renewable feedstock like water, wind, or solar energy. In the following, the system 100 is explained under the assumption that the renewable energy source 10 is a windmill. However, this should not have any limiting effect on the invention.

The windmill 10 is connected to an energy grid 300 to supply energy generated by the windmill 10 to the grid 300. Therein, an energy amount 1" which is at least a fraction of the energy 1 generated by the windmill 10 is provided to the energy grid 300 to meet the energy demands of the consumers in the energy grid 300. It might be mentioned that the energy grid 300 would normally also have access to other energy sources.

However, a remaining energy amount 1' of the generated energy 1 can be used in the system 100 to operate an Hydrogen-Nitrogen-production unit 20 (H2-N2-production unit) of the system 100.

Especially when excess energy is available, i.e. when the energy 1 generated by the renewable energy source 10 is exceeding the energy demand of the energy grid 300 to the renewable energy source 10, this excess energy can be directed to the H2-N2-production unit 20 to operate the unit 20. The amount of energy 1' which is fed to the H2-N2-production unit 20 depends on the energy demands of consumers to be supplied by the energy grid 300. I.e. in case of high demands, e.g. during peak times, it might be necessary that 100% of the energy 1 generated by the windmill 10 has to be fed into the electricity grid 300 to cover the demand. In contrast, in case of very low demands, e.g. during night times, 100% of the electricity 1 generated by the windmill 10 might be available for use in the system 100 and can be directed to the H2-N2-production unit 20.

Such managing and distribution of energy 1 from the windmill 10 is achieved by an energy distribution unit 11. The energy distribution unit 11 receives the energy 1 from the windmill 10. As indicated above, certain ratios of the energy 1 are directed to the energy grid 300 and/or to the system 100 and the H2-N2-production unit 20, respectively, depending on the energy demand situation in the energy grid 300. Thus, the energy distribution unit 11 is configured to receive the energy 1 provided by the renewable energy source 10 and to distribute the energy 1 to the energy grid 300 and/or to the H2-N2-O2-production unit 20, wherein the distribution depends on an energy demand situation in the energy grid 300.

For example, in case a high amount of energy is demanded in the grid 300, most or all of the energy 1 would be directed to the grid 300 and only less energy 1' would be provided to the H2-N2-production unit 20. In case the demand situation is such that only less energy is demanded in the grid 300, most or all of the energy 1 provided by the renewable energy source 10 can be used for generation of NH3. Thus, a high amount of energy 1' would be provided to the H2-N2-O2-production unit 20.

As mentioned above, the energy amount 1' of the energy 1 generated by the renewable energy source 10 is supplied to the system 100 and to the H2-N2-production unit 20 to achieve the production of NH3. The H2-N2-production unit 20 comprises a Hydrogen electrolyzer 21 and an air separation unit 22.

The Hydrogen electrolyzer 21 of the H2-N2-production unit 20 is used to generate Hydrogen 4 and Oxygen 6 through the electrolysis of water 2. The Hydrogen electrolyzer 21 is supplied with water 2 from an arbitrary source (not shown) and it is operated using energy 1' from the windmill 10. Oxygen 6 is a byproduct of the electrolyzer 21 and it can be vented and released into the ambient air.

The air separation unit (ASU) 22 of the H2-N2-production unit 20 is used for the generation of Nitrogen 5. Energy 1' provided by the windmill 10 is used to operate the ASU 22 which utilizes conventional air separation techniques to separate Nitrogen 5 from air 3. The remaining components of the air 3, i.e. Oxygen and others, can be released into the ambient air.

Thus, the windmill 10 is utilized to provide the energy 1' for both the electrolysis of water 2 to form Hydrogen 4 with the Hydrogen electrolyzer 21 and for separating Nitrogen 5 from air 3 using the ASU 22.

Both Hydrogen 4 and Nitrogen 5 are then directed to a mixing unit 30 of the system 100. The mixing unit 30 comprises a temporary storage unit 31, a mixer 32 and a compressor 33. First, Hydrogen 4 and Nitrogen 5 pass the temporary storage unit 31 before being mixed in the mixer 32. The resulting Hydrogen-Nitrogen-gas mixture 8 (H2-N2-gas mixture) is subsequently compressed to fifty or more atmospheres in the compressor 33.

Ammonia NH3 can now be formed by processing the compressed H2-N2-gas mixture 8 in the presence of a catalyst at an elevated temperature. This is achieved in a NH3 reaction chamber 41 of an NH3 source 40 of the system 100. The compressed H2-N2-gas mixture 8 from the mixing unit 30 and from the compressor 33, respectively, is directed to the NH3 reaction chamber 41. The reaction chamber 41 comprises one or more NH3 reaction beds 42 which are operated at an elevated temperature of, for example, 350-450° C. In an exothermic chemical reaction, the NH3 reaction chamber 41 produces a mixture of NH3 and, additionally, Nitrogen N2 and Hydrogen H2 out of the H2-N2-gas mixture from the mixer 30, i.e. the NH3 reaction chamber releases an NH3-H2-N2-gas mixture 9.

For example, a suitable catalyst can be based on iron promoted with K2O, CaO, SiO2, and Al2O3 or, rather than the iron based catalyst, ruthenium.

The NH3-H2-N2-mixture 9 is directed to a separator 43 of the NH3 source 40, for example a condenser, where NH3 is separated from the NH3-H2-N2-mixture 9. Thus, the separator 43 produces NH3, which is sent to an NH3 storage vessel 44 of the NH3 source 40, and a remaining H2-N2-gas mixture 8'.

It can be assumed that an extensive knowledge base exists both on the storage and on the transportation of Ammonia. The same is applicable for the handling and transportation of Hydrogen, Nitrogen and Hydrogen-Nitrogen-mixtures. Therefore, the NH3 storage vessel 44 as well as the variety of ducts which connect all the components of the system 100 for directing NH3 and other gases or gas mixtures are not described in detail.

As explained above, the separator 43 generates NH3 out of the NH3-H2-N2-mixture 9 provided by the NH3 reaction chamber 41 and a H2-N2-gas mixture 8' remains. In one embodiment of the invention, for which two variations are shown in FIGS. 2 and 3, this remaining H2-N2-gas mixture 8' is re-cycled to be utilized again for the generation of NH3 in the NH3 reaction chamber 41.

Figure 2:
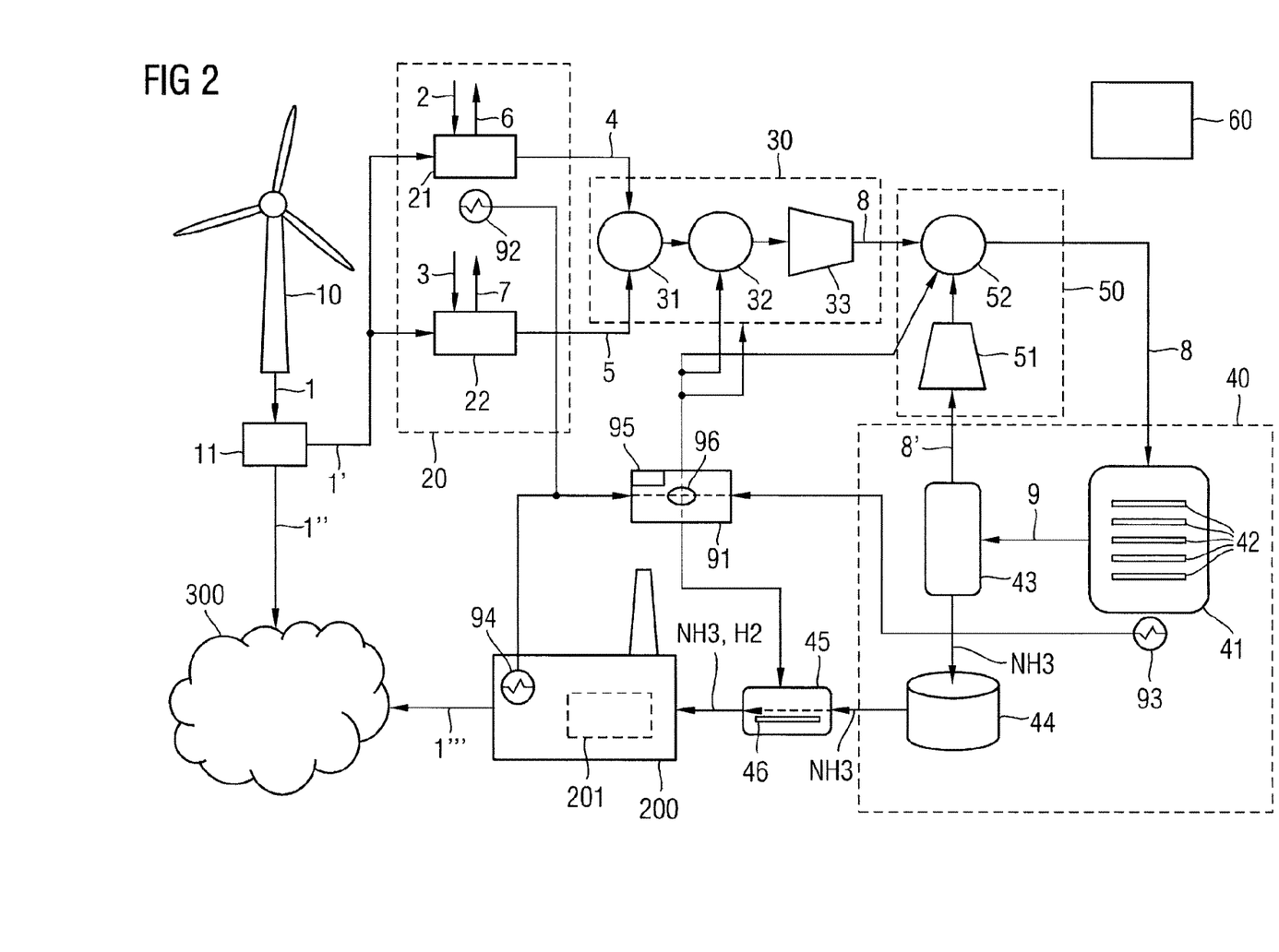
FIG. 2 shows a further embodiment of the system with a re-cycling of a remaining H2-N2-gas mixture.

For this, the system 100 of this embodiment as shown in FIG. 2 comprises an additional re-processing unit 50 with a re-compressor 51 and a mixer 52. Moreover, this embodiment of the invention differs from the above described basic embodiment of the invention in that the compressed H2-N2-gas mixture 8 from the compressor 33 is not passed directly to the NH3 reaction chamber 41, but it reaches the NH3 reaction chamber 41 only via the mixer 52 of the re-processing unit 50. The remaining H2-N2-gas mixture 8' of the separator 43 is passed to the re-compressor 51 of the re-processing unit 50 of the system 100. Like the compressor 33, the re-compressor 51 compresses the remaining H2-N2-gas mixture 8' to fifty or more atmospheres to account for pressure losses during the processing in the NH3 reaction chamber 41 and in the separator 43. The re-compressed remaining H2-N2-gas mixture 8' is then passed to the mixer 52 where it is mixed with the fresh H2-N2-gas mixture 8 from the mixer 30 and the compressor 33, respectively. The mixer 52 generates a mixture 8 of the H2-N2-gas mixtures 8, 8' which is subsequently directed to the NH3 reaction chamber 41. In the following, the gas mixture is processed as described above in the NH3 source 40 to produce NH3 and, again, a remaining H2-N2-gas mixture 8'.

Figure 3:
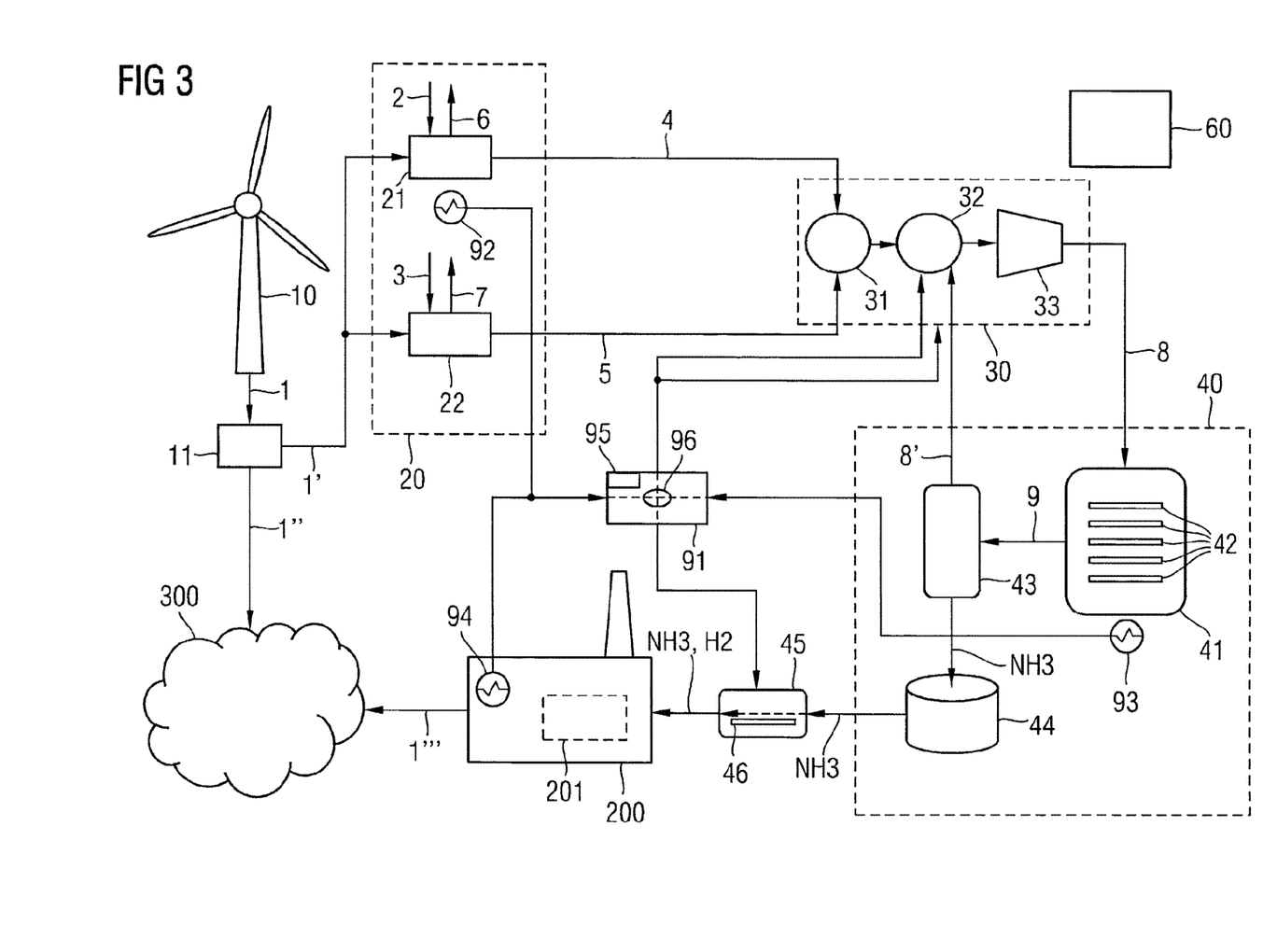
FIG. 3 shows a variation of the further embodiment of the system.

FIG. 3 shows a variation of the embodiment shown in FIG. 2. The remaining H2-N2-gas mixture 8' is directly fed into the mixer 32 of the mixing unit 30 to be mixed with the incoming Hydrogen and Nitrogen from the temporary storage unit 31. A separate re-processing unit 50 is not used.

In the following, reference is made again to FIG. 1. However, the details and features described below are also applicable for the embodiments and variations shown in FIGS. 2 and 3.

The NH3 storage vessel 44 is fluidly connected with an NH3 power generator 200 such that an NH3 gas stream can be established to transport NH3 from the storage vessel 44 to the NH3 power generator 200. Ammonia can be used in a number of different combustion cycles, for example in the Brayton cycle or in the Diesel cycle. However, at a power level of a windmill or a windfarm, it would be appropriate to use a gas turbine for combustion of Ammonia for the generation of electrical energy, wherein the Brayton cycle would be applicable for a gas turbine solution. Thus, the NH3 power generator 200 can be a gas turbine which is configured for the combustion of Ammonia. It has been shown earlier that conventional gas turbines with only slight modifications of the burner would be suitable.

The gas turbine 200 combusts the NH3 from the NH3 storage vessel 44 for the generation of energy 1''' in a combustion chamber 201 of the NH3 power generator 200 and gas turbine, respectively. This energy 1''' can then be fed into the energy grid 300.

Moreover, the system 100 shown in the FIGs comprises an optional NH3 cracker 45 which is located between the NH3 storage vessel 44 and the NH3 power generator 200 and which is fluidly connected to the NH3 storage vessel 44 and to the NH3 power generator 200. The NH3 cracker 45 receives NH3 from the NH3 storage vessel 44 and which passes a catalyst bed 46 of the NH3 cracker 45 to effect a partial cracking of the received NH3 to form an NH3-Hydrogen-mixture (NH3,H2). The NH3-Hydrogen-mixture (NH3,H2) is subsequently directed to the NH3 power generator 200 for combustion, as described above.

It might be mentioned that an operation of the system 100 as described above would be possible without the NH3 cracker 45. However, utilization of the NH3 cracker 45 allows to provide an NH3-Hydrogen-gas-mixture to the NH3 power generator 200 which has better combustion properties.

The system 100 moreover comprises a main control unit 60 which is configured to control various components of the system 100 (connections of the main control unit 60 with other components of the system 100 are not shown in FIG. 1 to avoid confusion). Especially, the main control unit 60 controls the process of generating energy 1''' for the energy grid 300 and the production of NH3.

In case the energy supply from the windmill 10 and the energy managing unit 11, respectively, to the system 100 is too low, for example due to high energy demands in the energy grid 300, the main control unit 60 reduces the production of NH3 by reducing the gas mass flow in the system 100 by powering down the compressors 33, 51 and/or the H2-N2-production unit 20 with the electrolyzer 21 and the ASU 22. Thus, less energy 1' is directed from the windmill 10 to the system 100 and more energy 1'' is available for the energy grid 300. Moreover, the main control unit 60 increases the NH3 mass flow from the NH3 storage vessel 44 to the NH3 power generator 200. Consequently, the NH3 power generator 200 increases the generation of energy 1''' required for the energy grid 300 in order to guarantee a stable energy supply in the grid 300 to achieve a balanced load.

In case the energy supply from the windmill 10 and the electricity managing unit 11, respectively, to the system 100 is too high, for example when the windmill 10 generates more energy than required by the energy grid 300, the main control unit 60 intensifies the production of NH3 in the system 100 by increasing the gas mass flow in the system 100 by providing more power to the compressors 33, 51, to the electrolyzer 21 and/or to the ASU 22. This results in an increased production of NH3 which is stored in the NH3 storage vessel 44. However, the generation of energy 1''' from the NH3 power generator 200 for the energy grid 300 is not increased, but it might be decreased.

Moreover, the main control unit 60 controls the generation of power in the NH3 power generator 200 based on the energy consumption and demand in the electricity grid 300 and based on the available power supply by any energy sources available for the grid 300. Thus, in case the available power supply in the grid 300 is less than the demand, the main control unit 60 would power up the NH3 power generator 200 to cover the demand. In case the available power supply in the grid 300 is higher than the demand, the main control unit 60 would power down the NH3 power generator 200 and the NH3 generation would be intensified by supplying more energy to the H2-N2-production unit 20 and by increasing the mass flow in the system 100 so that the NH3 storage vessel 44 can be filled up again.

In other words, the main control unit 60 is configured to reduce the generation of NH3 to be directed to the NH3 storage vessel 44 and/or increase the generation of energy 1''' during periods of too low renewable energy input 1, e.g. during periods of low wind and/or high energy demands in the energy grid 300. Also, the main control unit 60 is configured to increase the generation of NH3 to be directed to the NH3 storage vessel 44 and/or reduce the generation of energy 1''' during periods of too high renewable energy input 1, e.g. during periods of strong winds and/or low energy demands in the grid 300.

Thus, the controlling performed by the main control unit 60 may depend on the actual power demand in the energy grid 300, the energy 1 generated by the renewable energy source 10, and/or the actual amount of energy 1' from the renewable energy source 10 available for the system 100.

Correspondingly, the main control unit 60 has to be connected to the energy grid 300 to receive information about the current energy demand and coverage in the grid 300. Moreover, the main control unit 60 would be connected to the energy distribution unit 11 and/or to the windmill 10 directly to receive information about energy 1, 1', 1" provided by the windmill 10 and available for usage in the system 100 and in the grid 300. The main control unit 60 would have to be connected to the H2-N2-production unit 20 to control the amount of produced Hydrogen and Nitrogen and to the various mixers and compressors, if applicable, to regulate the mass flow in the system. With this, the main control unit 60 can regulate the production of NH3 to be directed to the NH3 storage vessel 44. In addition to this, the main control unit 60 is connected to the NH3 storage vessel 44 to regulate the supply of NH3 to the NH3 power generator 200 and to the NH3 cracker 45, respectively. Also, the main control unit 60 is connected to the NH3 power generator 200 itself to regulate the energy generation by NH3 combustion.

However, at different stages and components, respectively, of the system 100 waste heat is generated which can be utilized for operating other stages or components of the system 100. For this, the system 100 comprises a heat distribution system 91, 92, 93, 94 with one or more heat exchangers 92, 93, 94. Each one of the one or more heat exchangers 92, 93, 94 is assigned to and in thermal contact with at least one of one or more first components 21, 41, 200 of the system 100 for receiving process heat from the assigned first component 21, 41, 200 during operation of the first one component 21, 41, 200. For example, process heat can be waste heat or other heat which is generated during operation of the corresponding first component 21, 41, 200 and which is not of use for the operation of the first component 21, 41, 200. Thus, components of the system 100 qualify to be such a first component when they generate heat during operation of the first component.

Moreover, each one of the one or more first components 21, 41, 200 is assigned to and in thermal contact with at least one of the one or more heat exchangers 92, 93, 94. The heat generated by a first component 21, 41, 200 is transferred to the assigned heat exchanger 92, 93, 94 due to the thermal contact.

Each one of the one or more heat exchangers 92, 93, 94 is arranged and configured to transfer at least a portion of process heat received from the assigned first component to at least one of one or more second components 30, 32, 45, 52 of the system 100. Therein, a component of the system 100 qualifies to be a such a second component 30, 32, 45, 52 when the component consumes heat during operation of the component or when at least an improved operation and/or efficiency results in case an elevated operating temperature can be provided. Both the heat to be consumed by the second component and the heat necessary to improve operation or efficiency of the component can be provided by the heat exchangers 92, 93, 94.

A variety of different combinations of first and second components of the system 100 is possible, as shown in FIGS. 1, 2 and 3.

In concrete, a first heat exchanger 92 is assigned to and in thermal contact with the Hydrogen electrolyzer 21. Thus, at least a portion of heat generated during the operation of the Hydrogen electrolyzer 21 is taken up by the first heat exchanger 92 to be provided to a second component.

A second heat exchanger 93 is assigned to and in thermal contact with the NH3 reaction chamber 41. Therein, the reaction beds 42 produce heat during operation. At least a portion of the heat is taken up by the second heat exchanger 93.

A third heat exchanger 94 is assigned to and in thermal contact with the NH3 power generator 200, for example it might be arranged at an exhaust system of the power generator 200 where waste heat is released. At least a portion of the waste heat is taken up by the third heat exchanger 94.

The heat collected by the heat exchangers 92, 93, 94 can be used in various components of the system 100. For example, pre-heating of input gases to be processed in the mixers 32, 52, i.e. Hydrogen, Nitrogen and/or a Hydrogen-Nitrogen-mixture, would result in an improved efficiency of the synthesis process because less heat from external sources would be required during the reaction process in the mixers 32, 52. Similarly, heat from one or more of the heat exchangers 92, 93, 94 can be used advantageously in the NH3 cracker for heating up the catalyst bed 46.

Thus, heat collected by one or more of the heat exchangers 92, 93, 94 can be transferred to one or more of the mixers 32, 52, to the mixing unit 30, and/or to the NH3 cracker 45.

In a basic approach, heat collected by one particular of the heat exchangers 92, 93, 94 would be transferred to a particular second component, for example one of the mixers 32, 52, the mixing unit 30, or the NH3 cracker 45. Thus, a fixed connection between the particular heat exchanger and the particular second component for transfer of heat would be established. For example (not shown), in a particular embodiment, the heat exchangers 92, 93, 94 are connected to the mixer 32. In another particular embodiment, the heat exchangers 92, 93, 94 are connected to the mixer 52. In a further particular embodiment, the heat exchangers 92, 93, 94 are connected to the mixer 45. Other fixed combinations of heat exchangers 92, 93, 94 and second components 30, 32, 45, 52 are possible.

However, the direct assignment of one or more of the first components and the assigned heat exchangers 92, 93, 94, respectively, to one or more of the second components 30, 32, 45, 52 results in limited flexibility. Therefore, the system 100 comprises a heat collector and transmitter 91 which manages a forwarding and/or distribution of heat from one or more of the heat exchangers 92, 93, 94 to one or more of the second components 30, 32, 45, 52. For this, the heat collector and transmitter 91 might comprise a corresponding switch 96 and a heat control system 95 to control the switch 96. The heat control system 95 can be managed by the main control system 60.

The heat control system 95 controls the distribution of heat to the second components 30, 32, 45, 52 such that the second components 30, 32, 45, 52 operate at the optimum operating points. Therein, a constellation might arise under which it is not possible that each of the second components 30, 32, 45, 52 works with optimum operating points. In that case, the heat control system 95 distributes the available heat such that, under the given circumstances, the best possible overall performance and efficiency of the system 100 is achieved.

Finally, the main control unit 60 can be used to control the optimum operating points of the heat exchangers 92, 93, 94, the heat collector and transmitter 91, and/or the NH3 cracker 45.

The invention claimed is:

1. A system for providing energy for an energy grid based on energy provided by a renewable energy source, comprising
an H2-N2-production unit for producing Hydrogen and Nitrogen, wherein the H2-N2-production unit is operated by using energy provided by the renewable energy source,
a mixing unit configured to receive and mix the Hydrogen and the Nitrogen produced by the H2-N2-production unit to form a Hydrogen-Nitrogen-mixture,
an NH3 source for receiving and processing the Hydrogen-Nitrogen-mixture for generating a gas mixture containing NH3, wherein the NH3 source comprises an NH3 storage vessel for storing at least a part of the NH3 of the gas mixture containing NH3,
an NH3 power generator for generating energy for the energy grid, wherein the NH3 power generator is fluidly connected to the NH3 storage vessel to receive a gas stream containing NH3 from the NH3 storage vessel and wherein the NH3 power generator comprises a combustion chamber to combust the received NH3 of the gas stream to generate the energy for the energy grid,
a heat distribution system with one or more heat exchangers, wherein each one of the one or more heat exchangers is in thermal contact with and assigned to at least one of one or more first components of the system for receiving process heat from the assigned at least one first component during operation of the at least first one component, and wherein each one of the one or more heat exchangers is arranged and configured to transfer at least a portion of received process heat to at least one of one or more second components of the system, and
an NH3 cracker, which is fluidly connected to the NH3 storage vessel and to the NH3 power generator, wherein the NH3 cracker is configured and arranged to
receive NH3 from the NH3 storage vessel,
effect a partial cracking of the received NH3 to form an NH3-Hydrogen-mixture and
direct the NH3-Hydrogen-mixture to the NH3 power generator for combustion,
wherein one of the one or more second components is the NH3 cracker; and
wherein one of the one or more second components is the mixing unit, wherein the transferred portion of process heat is utilized in the mixing of Hydrogen and Nitrogen.

2. The system according to claim 1,
wherein one of the one or more first components is the NH3 power generator.

3. The system according to claim 1,
wherein the H2-N2-production unit comprises
a Hydrogen electrolyzer for producing the Hydrogen, wherein the Hydrogen electrolyzer is configured to receive water and energy produced by the renewable energy source and to produce the Hydrogen by electrolysis, and/or
an air separation unit for producing the Nitrogen, wherein the air separation unit is configured to receive air and energy produced by the renewable energy source and to produce the Nitrogen by separating the received air.

4. The system according to claim 3,
wherein one of the one or more first components is the Hydrogen electrolyzer.

5. The system according to claim 1, further comprising
an energy distribution unit which is configured to receive the energy provided by the renewable energy source and to distribute the energy to the energy grid and/or to the H2-N2-production unit, wherein the distribution depends on an energy demand situation in the energy grid.

6. A system for providing energy for an energy grid based on energy provided by a renewable energy source, comprising
an H2-N2-production unit for producing Hydrogen and Nitrogen, wherein the H2-N2-production unit is operated by using energy provided by the renewable energy source,
a mixing unit configured to receive and mix the Hydrogen and the Nitrogen produced by the H2-N2-production unit to form a Hydrogen-Nitrogen-mixture,
an NH3 source for receiving and processing the Hydrogen-Nitrogen-mixture for generating a gas mixture containing NH3, wherein the NH3 source comprises an NH3 storage vessel for storing at least a part of the NH3 of the gas mixture containing NH3,
an NH3 power generator for generating energy for the energy grid, wherein the NH3 power generator is fluidly connected to the NH3 storage vessel to receive a gas stream containing NH3 from the NH3 storage vessel and wherein the NH3 power generator comprises a combustion chamber to combust the received NH3 of the gas stream to generate the energy for the energy grid,
a heat distribution system with one or more heat exchangers, wherein each one of the one or more heat exchangers is in thermal contact with and assigned to at least one of one or more first components of the system for receiving process heat from the assigned at least one first component during operation of the at least first one component, and wherein each one of the one or more heat exchangers is arranged and configured to transfer at least a portion of received process heat to at least one of one or more second components of the system, and
an NH3 cracker, which is fluidly connected to the NH3 storage vessel and to the NH3 power generator, wherein the NH3 cracker is configured and arranged to receive NH3 from the NH3 storage vessel,
effect a partial cracking of the received NH3 to form an NH3-Hydrogen-mixture and
direct the NH3-Hydrogen-mixture to the NH3 power generator for combustion,
wherein one of the one or more second components is the NH3 cracker
wherein the mixing unit is fluidly connected to the H2-N2-production unit to receive the Hydrogen and Nitrogen produced therein, wherein the mixing unit comprises
a mixer for mixing the Hydrogen with the Nitrogen to form a Hydrogen-Nitrogen-mixture and
a compressor for compressing the Hydrogen-Nitrogen-mixture from the mixer to form a compressed Hydrogen-Nitrogen-mixture to be directed to the NH3 source, and
wherein one of the one or more second components is the mixer.

7. A system for providing energy for an energy grid based on energy provided by a renewable energy source, comprising
an H2-N2-production unit for producing Hydrogen and Nitrogen, wherein the H2-N2-production unit is operated by using energy provided by the renewable energy source,
a mixing unit configured to receive and mix the Hydrogen and the Nitrogen produced by the H2-N2-production unit to form a Hydrogen-Nitrogen-mixture,
an NH3 source for receiving and processing the Hydrogen-Nitrogen-mixture for generating a gas mixture containing NH3, wherein the NH3 source comprises an NH3 storage vessel for storing at least a part of the NH3 of the gas mixture containing NH3,
an NH3 power generator for generating energy for the energy grid, wherein the NH3 power generator is fluidly connected to the NH3 storage vessel to receive a gas stream containing NH3 from the NH3 storage vessel and wherein the NH3 power generator comprises a combustion chamber to combust the received NH3 of the gas stream to generate the energy for the energy grid,
a heat distribution system with one or more heat exchangers, wherein each one of the one or more heat exchangers is in thermal contact with and assigned to at least one of one or more first components of the system for receiving process heat from the assigned at least one first component during operation of the at least first one component, and wherein each one of the one or more heat exchangers is arranged and configured to transfer at least a portion of received process heat to at least one of one or more second components of the system, and
an NH3 cracker, which is fluidly connected to the NH3 storage vessel and to the NH3 power generator, wherein the NH3 cracker is configured and arranged to receive NH3 from the NH3 storage vessel,
effect a partial cracking of the received NH3 to form an NH3-Hydrogen-mixture and
direct the NH3-Hydrogen-mixture to the NH3 power generator for combustion,
wherein one of the one or more second components is the NH3 cracker
wherein the NH3 source comprises an NH3 reaction chamber configured to receive the Hydrogen-Nitrogen-mixture from the mixing unit and to process the received Hydrogen-Nitrogen-mixture to form the gas mixture containing NH3 by an exothermic chemical reaction, wherein one of the one or more first components is the NH3 reaction chamber,
wherein the NH3 source further comprises a separator for receiving the gas mixture containing NH3 from the NH3 reaction chamber,
wherein the separator is configured to separate NH3 from the gas mixture containing NH3 such that NH3 and a remaining Hydrogen-Nitrogen-mixture are produced, and
wherein the separator is fluidly connected to the NH3 storage vessel to direct the produced NH3 to the NH3 storage vessel,
further comprising
a re-processing unit for re-processing the remaining Hydrogen-Nitrogen-mixture with a re-compressor and a second mixer,
wherein the re-compressor is fluidly connected to the separator to receive and compress the remaining Hydrogen-Nitrogen-mixture from the separator,
wherein the second mixer is fluidly connected to the re-compressor to receive the compressed remaining Hydrogen-Nitrogen-mixture from the re-compressor,
wherein the second mixer is fluidly connected to the mixing unit to receive the Hydrogen-Nitrogen-mixture from the mixing unit, and
wherein the second mixer is configured to mix the Hydrogen-Nitrogen-mixture from the mixing unit and the compressed remaining Hydrogen-Nitrogen-mixture from the re-compressor to form the Hydrogen-Nitrogen mixture to be provided to the NH3 source.

8. The system according to claim 7,
wherein one of the one or more second components is the second mixer.

9. A system for providing energy for an energy grid based on energy provided by a renewable energy source, comprising
an H2-N2-production unit for producing Hydrogen and Nitrogen, wherein the H2-N2-production unit is operated by using energy provided by the renewable energy source,
a mixing unit configured to receive and mix the Hydrogen and the Nitrogen produced by the H2-N2-production unit to form a Hydrogen-Nitrogen-mixture,
an NH3 source for receiving and processing the Hydrogen-Nitrogen-mixture for generating a gas mixture containing NH3, wherein the NH3 source comprises an NH3 storage vessel for storing at least a part of the NH3 of the gas mixture containing NH3,
an NH3 power generator for generating energy for the energy grid, wherein the NH3 power generator is fluidly connected to the NH3 storage vessel to receive a gas stream containing NH3 from the NH3 storage vessel and wherein the NH3 power generator comprises a combustion chamber to combust the received NH3 of the gas stream to generate the energy for the energy grid,
a heat distribution system with one or more heat exchangers, wherein each one of the one or more heat exchangers is in thermal contact with and assigned to at least one of one or more first components of the system for receiving process heat from the assigned at least one first component during operation of the at least first one component, and wherein each one of the one or more heat exchangers is arranged and configured to transfer at least a portion of received process heat to at least one of one or more second components of the system, and an NH3 cracker, which is fluidly connected to the NH3 storage vessel and to the NH3 power generator, wherein the NH3 cracker is configured and arranged to receive NH3 from the NH3 storage vessel, effect a partial cracking of the received NH3 to form an NH3-Hydrogen-mixture and direct the NH3-Hydrogen-mixture to the NH3 power generator for combustion, wherein one of the one or more second components is the NH3 cracker, wherein the NH3 source comprises an NH3 reaction chamber configured to receive the Hydrogen-Nitrogen-mixture from the mixing unit and to process the received Hydrogen-Nitrogen-mixture to form the gas mixture containing NH3 by an exothermic chemical reaction, wherein one of the one or more first components is the NH3 reaction chamber, wherein the NH3 source further comprises a separator for receiving the gas mixture containing NH3 from the NH3 reaction chamber, wherein the separator is configured to separate NH3 from the gas mixture containing NH3 such that NH3 and a remaining Hydrogen-Nitrogen-mixture are produced, and wherein the separator is fluidly connected to the NH3 storage vessel to direct the produced NH3 to the NH3 storage vessel wherein the separator is fluidly connected to the mixing unit to direct the remaining Hydrogen-Nitrogen-mixture from the separator to the mixing unit, such that the remaining Hydrogen-Nitrogen-mixture is mixed in the mixing unit with the Hydrogen and the Nitrogen from the H2-N2-production unit to form the Hydrogen-Nitrogen-mixture to be received by the NH3 source.

10. A method for providing energy for an energy grid based on energy provided by a renewable energy source, the method comprising:

using at least a part of the energy from the renewable energy source to produce Hydrogen and Nitrogen in a H2-N2-production unit, mixing the produced Hydrogen and Nitrogen in a mixing unit to form a Hydrogen-Nitrogen-mixture, processing the Hydrogen-Nitrogen-mixture in an NH3 source to generate a gas mixture containing NH3, storing NH3 of the gas mixture containing NH3 in a NH3 storage vessel, directing an NH3 stream from the NH3 storage vessel to a combustion chamber of an NH3 power generator for combusting the NH3 of the NH3 stream to generate energy for the energy grid, wherein at least a portion of process heat generated in at least one of one or more first components of the system during operation of the at least one first component is transferred to at least one of one or more second components of the system, wherein the NH3 stream from the NH3 storage vessel is directed to an NH3 cracker before it reaches the NH3 power generator, wherein the NH3 cracker effects a partial cracking of the NH3 received from the NH3 storage vessel to form an NH3-Hydrogen-mixture, wherein the NH3-Hydrogen-mixture is directed as NH3 stream to the NH3 power generator for combustion, wherein one of the one or more second components is the NH3 cracker, and wherein one of the one or more second components is the mixing unit, or a mixer of the mixing unit for mixing the Hydrogen with the Nitrogen to form a Hydrogen-Nitrogen-mixture, wherein the transferred portion of process heat is utilized in the mixing of Hydrogen and Nitrogen.

11. The method according to claim 10, wherein one of the one or more first components is the NH3 power generator.

12. The method according to claim 10, wherein the Hydrogen is produced in a Hydrogen electrolyzer of the H2-N2-production unit, wherein one of the one or more first components is the Hydrogen electrolyzer.

13. The method according to claim 10, wherein the NH3 source comprises an NH3 reaction chamber which receives the Hydrogen-Nitrogen-mixture from the mixing unit and which processes the received Hydrogen-Nitrogen-mixture to form the gas mixture containing NH3 by an exothermic chemical reaction, wherein one of the one or more first components is the NH3 reaction chamber.

14. A method for providing energy for an energy grid based on energy provided by a renewable energy source, the method comprising:

using at least a part of the energy from the renewable energy source to produce Hydrogen and Nitrogen in a H2-N2-production unit, mixing the produced Hydrogen and Nitrogen in a mixing unit to form a Hydrogen-Nitrogen-mixture, processing the Hydrogen-Nitrogen-mixture in an NH3 source to generate a gas mixture containing NH3, storing NH3 of the gas mixture containing NH3 in a NH3 storage vessel, directing an NH3 stream from the NH3 storage vessel to a combustion chamber of an NH3 power generator for combusting the NH3 of the NH3 stream to generate energy for the energy grid, wherein at least a portion of process heat generated in at least one of one or more first components of the system during operation of the at least one first component is transferred to at least one of one or more second components of the system, wherein the NH3 stream from the NH3 storage vessel is directed to an NH3 cracker before it reaches the NH3 power generator, wherein the NH3 cracker effects a partial cracking of the NH3 received from the NH3 storage vessel to form an NH3-Hydrogen-mixture, wherein the NH3-Hydrogen-mixture is directed as NH3 stream to the NH3 power generator for combustion, wherein one of the one or more second components is the NH3 cracker, wherein the gas mixture containing NH3 is directed to a separator which separates NH3 from the gas mixture containing NH3 such that the NH3 to be stored in the NH3 storage vessel and a remaining Hydrogen-Nitrogen-mixture are produced, wherein the remaining Hydrogen-Nitrogen-mixture is re-compressed and the re-compressed remaining Hydrogen-Nitrogen-mixture is mixed with the Hydrogen-Nitrogen-mixture from the mixing unit in a second mixer to form the Hydrogen-Nitrogen-mixture to be received by the NH3 source.

15. The method according to claim 14, wherein one of the one or more second components is the second mixer.

* * * * *